CATHODE RAY TUBE BEAM SUPPRESSION SYSTEM FOR PRODUCING A RASTER WHICH CORRESPONDS TO A PREDETERMINED GEOMETRIC SHAPE

Filed July 27, 1964 2 Sheets-Sheet 1

INVENTORS
CHRISTIAAN J. SEUR &
J.E. MARQUERINCK
BY [signature]
AGENT

INVENTORS
CHRISTIAAN J. SEUR &
J.E. MARQUERINCK
BY Frank R. Trifari
AGENT

United States Patent Office 3,403,287

Patented Sept. 24, 1968

3,403,287

CATHODE RAY TUBE BEAM SUPPRESSION SYSTEM FOR PRODUCING A RASTER WHICH CORRESPONDS TO A PREDETERMINED GEOMETRIC SHAPE

Christian Jacobus Seur and Joost Engbert Marquerinck, Emmasingel, Eindhoven, Netherlands, assignors to North American Philips Company, Inc., New York, N.Y., a corporation of Delaware Filed July 27, 1964, Ser. No. 385,380
Claims priority, application Netherlands, Aug. 22, 1963, 297,011
9 Claims. (Cl. 315—22)

ABSTRACT OF THE DISCLOSURE

A system is provided for suppressing the beam of a cathode ray tube in certain regions of a scan, for example, when a rectangular raster is employed on a circular screen tube, the beam is suppressed when it is directed to off-screen regions. The suppressing signal is developed by producing parabolic wave shape signals from the deflection signals, adding the parabolic wave shape signals, and then clipping the added signals at a predetermined level in order to derive a beam switching signal.

Figure 1:
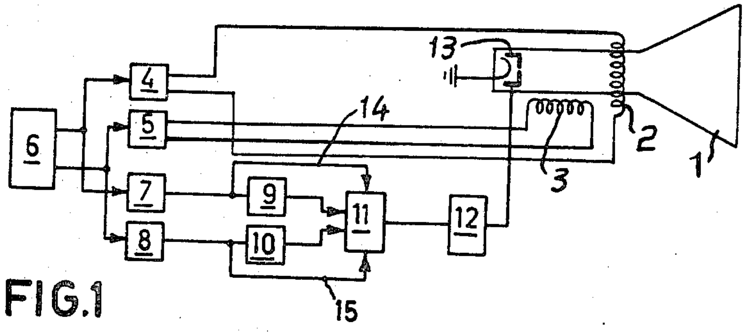

The invention relates to a circuit arrangement for producing switching pulses in synchronism with the electron-beam scanning of a television tube.

With television camera tubes and display tubes with electron-beam scanning in two substantially orthogonal directions the electron beam sweeps over a surface of the light-sensitive or light emitting screen respectively of the television tube, which surface has an approximately rectangular shape. Many television tubes have an approximately rectangular image screen, so that the dimensions of the surface scanned by the electron beam correspond with the dimensions of the picture. However, other television tubes have a shape differing from the rectangle; for example the Vidicon camera tube and the camera tube known under the name of "Plumbicon" have a round image screen and there are television display tubes having a round picture screen, for example in devices for reproducing and photographically recording X-ray pictures. With such television tubes it is common practice to scan only part of the screen, that is a rectangular surface lying completely inside the screen. This has the disadvantage that large portions of the light-sensitive or light-emitting screen remain unemployed, so that losses of light sensitivity and resolving power are involved. It is therefore more efficacious, particularly when a high light sensitivity and a great resolving power are desired, to arrange the scan so great that the whole picture screen lies within the scanned surface, so that any part of the screen is fully utilized.

In order to avoid damage of the television tube, care must then be taken that the electron beam is suppressed in the tube during the periods in which it is not directed towards the picture screen.

The invention has for its object to provide a circuit arrangement in which such a problem and similar further problems can be solved and the circuit arrangement according to the invention is characterized in that there is provided a first generator for producing a parabolic signal which is in synchronism with the scan in a first one of the said directions, and a second generator for producing a parabolic signal which is in synchronism with the scan in the other direction, in that the two parabolic signals are additively applied to the input circuit of a clipping device, which cuts off the parts of the signal fed to the input circuit lying on one side of a clipping level and allows the parts lying on the other side to pass and converts them into switching pulses, which are derived from the output circuit of the clipping device.

The invention will be described more fully with reference to the figures of the drawing.

FIG. 1 shows diagrammatically a first embodiment of an arrangement according to the invention.

Figure 2:
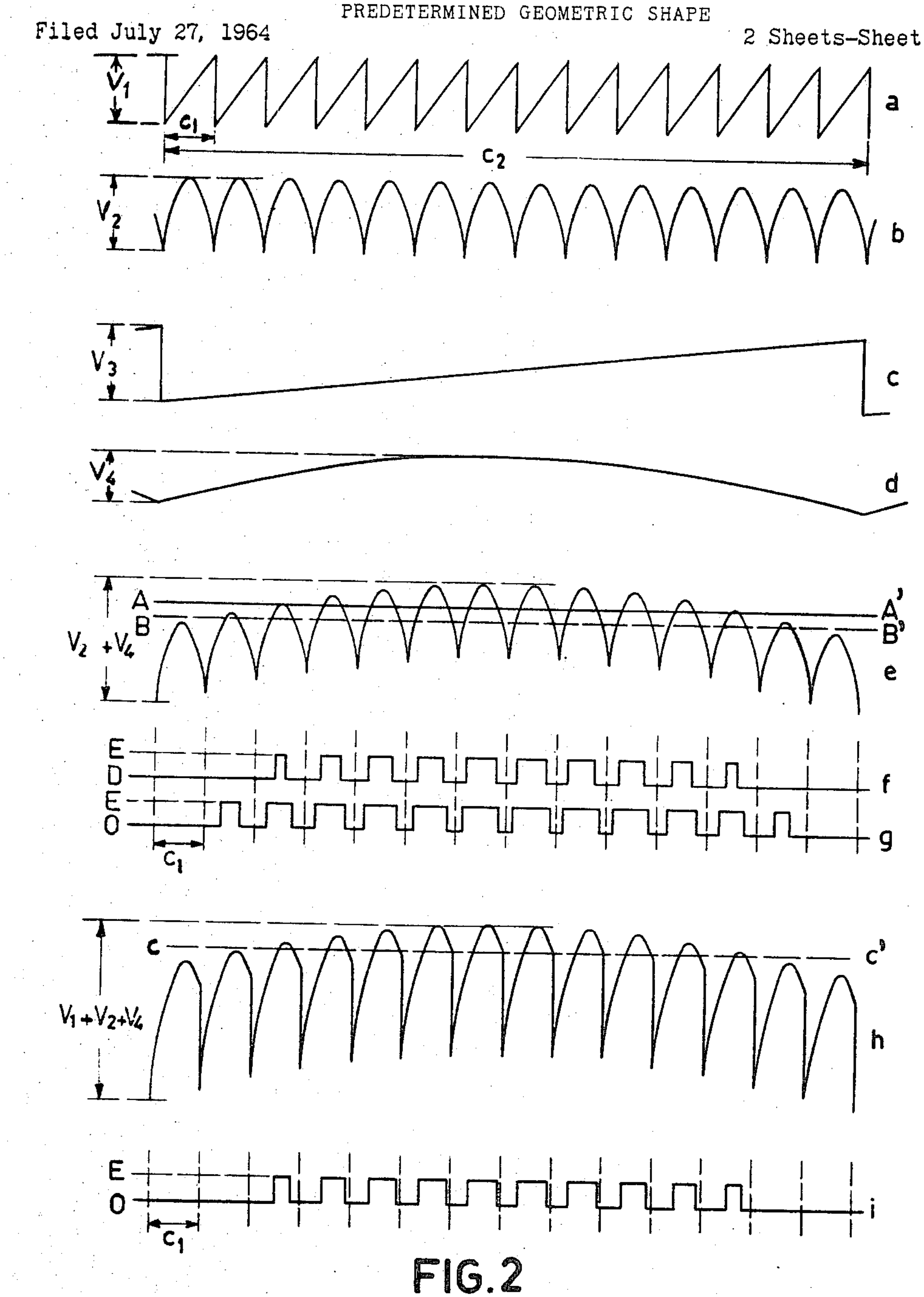

FIG. 2 serves for explaining the arrangement shown in FIG. 1.

Figure 3:
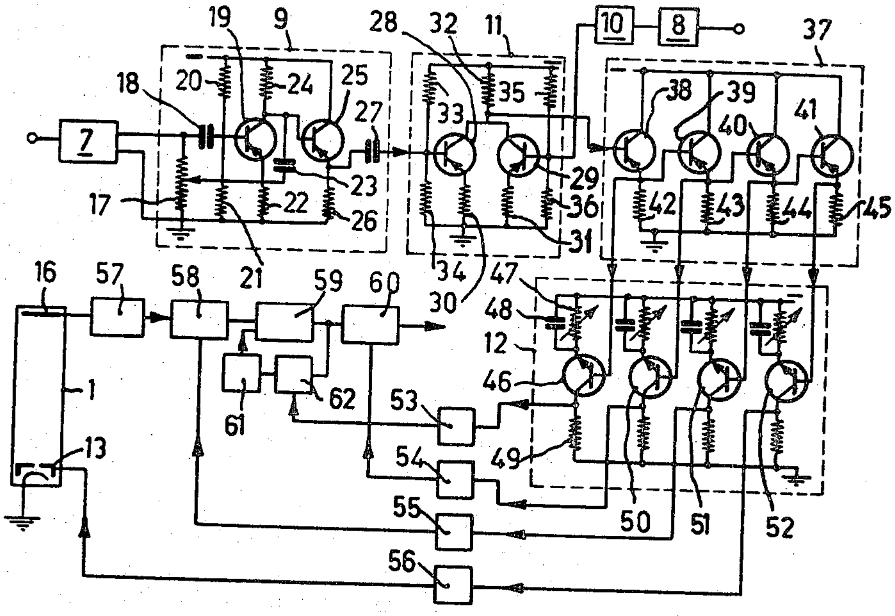

FIG. 3 shows a second embodiment of an arrangement according to the invention and FIG. 4 serves for further explanation of the embodiment of FIG. 3.

Referring to FIG. 1, reference numeral 1 designates a television tube comprising one or more line deflection coils 2 for the line deflection of the electron beam in the tube and one or more raster deflection coils 3 for the raster deflection of the electron beam. The sawtooth deflection currents for the coils 2 and 3 are supplied by a first line sawtooth generator 4 and a first raster sawtooth generator 5.

The two sawtooth generators 4 and 5 are synchronised with the aid of line and raster synchronising pulses respectively, which are supplied by a synchronising unit 6. This unit consists in television reproducing devices for example of a synchronisation separator which separates the synchronising pulses from the incoming television signal. With television camera devices the synchronising pulses can be produced independently in the unit 6.

In the principal diagram of FIG. 1 there is, moreover, provided a second line sawtooth generator 7 and a second raster sawtooth generator 8, which are synchronized by the line and raster synchronising pulses respectively of the synchronisation unit 6. The second sawtooth generator 7 thus produces a sawtooth signal which is in synchronism with the line deflection in the television tube, whereas the generator 8 produces a sawtooth signal in synchronism with the raster deflection in the television tube. If desired, the two line sawtooth generators or the two raster sawtooth generators may be combined to form one unit each. However, for technological reasons, it is preferred to use two separate sawtooth generators 4 and 7 and two separate raster sawtooth generators 5 and 8.

The sawtooth output signals of the generators 7 and 8 are supplied to two integration networks 9 and 10 respectively. It is known that by the integration of a sawtooth signal a parabolic signal is produced. With the aid of the integrating network 9 a parabolic signal is produced, which is in synchronism with the line deflection of the television tube, whereas the integrating network 10 produces a parabolic signal in synchronism with the raster deflection.

Subsequently, the two parabolic signals are added in an adder 11 and applied, in common, to the input circuit of a clipping device 12. The clipping device serves for supplying a voltage which differs according as the signal applied to the device lies above or below a given, preferably adjustable clipping level. Consequently, the clipping device supplies a sequence of switching pulses. In the embodiment shown in FIG. 1 these switching pulses are applied to the Wehnelt cylinder 13 of the television tube 1 for the periodical suppression of the electron beam in the television tube.

For further explanation of the invention FIG. 2 illustrates the waveforms of the signals appearing in the arrangement.

FIG. 2*a* shows the sawtooth voltage $V_1$, supplied by the generator 7, the period of which is equal to the line deflection period $c_1$ of the television tube, $c_2$ designates the raster deflection period. It should be noted that in practice one raster period $c_2$ includes several hundreds of line periods $c_1$. For a better understanding of the invention the raster period illustrated in FIG. 2 comprises only a few line periods (14). However, this simplification does not affect the principle of the invention. Also for simplifying the waveforms of the signals of FIG. 2 the line fly-back period and the raster fly-back period are omitted.

FIG. 2*b* illustrates the parabolic signal ($V_2$), which is obtained by integration and inversion of the sawtooth signal $V_1$ in the network 9. FIG. 2*c* shows the sawtooth signal ($V_3$), derived from the sawtooth generator 8 and FIG. 2*d* shows the parabolic signal $V_4$ obtained by integration and inversion of said signal.

The signals $V_2$ and $V_4$ are joined in the adder circuit 11. FIG. 2*c* illustrates the output signal of the adder ($V_2+V_4$), which is applied to the input circuit of the clipping device 12. In this figure a horizontal line A—A′ indicates the clipping level, on which the clipping device 12 is operative. When the signal $V_2+V_4$ applied to the input circuit of the clipping device is smaller than the clipping level A—A′, the clipping device supplies a voltage which is indicated by zero, whereas when the input signal $V_2+V_4$ exceeds the clipping level A—A′ the clipping device supplies a voltage which is indicated by E.

As will be seen from FIG. 2*e*, the signal $V_2+V_4$ always remains beneath the clipping level A—A′ for the first line periods of a raster period. During these line periods the clipping device supplies therefore a voltage 0 (see FIG. 2*f*). Subsequently, line periods appear, during part of one of which the input signal $V_2+V_4$ rises above the clipping level A—A′, so that the clipping device supplies the voltage E. With each further line period these parts increase until the raster scan has reached midway point. During the further propagation of the scan the parts during which the input signal rises above the clipping level gradually decrease and finally during the last line periods of a raster scan the input signal $V_2+V_4$ always remains beneath the clipping level, so that the clipping device supplies the voltage 0.

It thus appears that a pulse sequence (see FIG. 2*f*) is available at the output of the clipping device, whilst during each line period at the most one pulse occurs, the duration of which is greater according as the line period lies nearer the centre of the raster period. From FIG. 2*f* it will furthermore be apparent that these pulses are symmetrical to the centre of the raster period.

It is shown in FIG. 1 that the pulses supplied by the clipping device may be applied to the Wehnelt cylinder 13 of the television tube in a manner such that, when the clipping device supplies the voltage 0, the electron beam in the television tube is suppressed, whereas, when the clipping device supplies the voltage E, the electron beam is released in the television tube. It is thus achieved that whereas during the first and the last line periods, that is during the scan of the upper side and the lower side of the picture screen the electron beam is completely suppressed, during the scan of the further lines the electron beam is released over parts always lying midway the lines, the width of which parts increases according as the scanned line is nearer the centre of the screen. The portion of the picture screen virtually scanned by the electron beam appears, in general, to have an elliptical shape.

It is possible to obtain an accurately circular screen portion scanned by the electron beam by a correct choice of the ratio between the two amplitudes of the parabolic signals applied to the clipping device. It appears that such a circle is obtained, when the ratio between the amplitude of the parabolic signal ($V_2$) in synchronism with the line scan and the amplitude of the parabolic signal ($V_4$) in synchronism with the raster scan is equal to the square of the aspect ratio between the line deflection produced by the coils 2 and the raster deflection produced by the coils 3.

It should be noted that the clipping device as shown in FIG. 1 need not necessarily be preceded by an adding circuit. As an alternative, for example, when the clipping device is formed by a transistor, one of the parabolic signals may be applied to the base electrode and the other parabolic signal may be applied to the emitter electrode of the transistor. The parabolic signals are then operattive, in common, by addition, across the input circuit of the clipping device.

A circuit arrangement according to the invention permits of varying an adjusting in a very simple manner the size of the circle obtained. This may be achieved by displacing the clipping level on which the clipping device is operative. FIG. 2*e* indicates a second clipping level B—B′ and FIG. 2*g* illustrates the pulse sequence obtained with this clipping level at the output of the clipping device. When the ratio $V_2/V_4$ is chosen in the manner indicated above, like the pulses illustrated in FIG. 2*f* these pulses relate to a circle lying at the centre of the picture screen. A displacement of the clipping level of the clipping device therefore neither results in a deformation of the circle into for instance an ellipse nor in a displacement of the circle; it only involves a change of the size of the circle.

After the foregoing it will be obvious that with the aid of a circuit arrangement according to the invention a television camera or display tube with a round picture screen can be used, in which the whole picture screen is utilised for the picture recording and picture reproduction respectively. The sawtooth currents applied to the deflection coils 2 and 3 are chosen so high that the whole circular picture screen lies inside the rectangular surface scanned by the deflected beam. The switching pulses obtained from the clipping device are applied to a control-electrode of the television tube and the clipping level of the clipping device is adjusted so that the electron beam is always released when it strikes the picture screen, whereas it is suppressed as soon as the deflection falls outside the circular picture screen.

The circuit arrangement according to the invention may also be employed for other purposes, for example for obtaining a television picture with a circular insert, which contains part of a further television picture. To this end use may be made, for example, of an electronic switch having two inputs and one output, said switch being periodically changed over with the aid of pulses from the clipping device. The two television signals are applied each to an input of the switch and from the output is derived the signal providing the picture with the insert.

For this use and for similar uses it is desirable for the circle to be displaceable across the picture screen. As is illustrated diagrammatically in FIG. 1 by the connections 14 and 15, a sawtooth signal in synchronism with the line deflection and/or a sawtooth signal in synchronism with the raster deflection, together with the two parabolic signals is for this purpose applied to the input circuit of the clipping device.

FIG. 2*h* illustrates the waveform of the voltage obtained by joining the sawtooth singal $V_1$ of FIG. 2*a* to the two parabolic signals. When this voltage waveform $$(V_1+V_2+V_4)$$

is applied to the clipping device, having a clipping level indicated by the line C—C′ of FIG. 2*h*, the output of the clipping device furnishes the pulse sequence illustrated in FIG. 2*i*. It will be apparent that these pulses, in contrast to the pulses shown in FIGS. 2*f* and 2*g*, are shifted relatively to the centre of a line period. The pulse sequence indicated in FIG. 2*i* therefore relates to a circle shifted in the direction of the line scan, whilst the extent of displacement of the circle depends upon the magnitude of the sawtooth signal joined to the parabolic voltages.

In a similar manner it can be shown that the addition of a sawtooth signal in synchronism with the raster deflection ($V_3$) results in a shift of the circle in the direction of the raster deflection. It should be noted here that the addition of the sawtooth signals does not give rise to a deformation of the circle into an ellipse, for example. The size of the circle is, however, changed simultaneously with the displacement, but as stated above this change can be compensated by a change of the clipping level of the clipping device.

FIG. 3 shows more in detail an embodiment of a circuit arrangement according to the invention, which is particularly suitable for recording X-ray images. The parts corresponding with those of FIG. 1 are designated by the same reference numerals.

The arrangement comprises a television camera tube 1 of the Vidicon type or of the type known under the name of "Plumbicon." The tube comprises a picture screen 16, onto which the picture to be recorded is projected and from which the video signal is derived. The deflection coils associated with the tube are not shown in these figures.

The sawtooth generator 7 produces across a potentiometer 17 a sawtooth voltage which is in synchronism with the line deflection in the tube 1. This sawtooth voltage is applied through a coupling capacitor 18 to the base electrode of a transistor 19. Two resistors 20 and 21 serve for the D.C.-bias of said base electrode. The transistor 19 comprises a non-decoupled emitter resistor 22, so that the sawtooth voltage at the base electrode produces a sawtooth current through the transistor. This sawtooth current flows through an integrating capacitor 23, coupled with the collector electrode of the transistor, so that a parabolic voltage in synchronism with the line deflection is produced across said capacitor. The direct-current component of the collector current flows through a collector resistor 24, connected to the collectr electrode of the transistor 19.

The voltage across the capacitor 23 usually contains a sawtooth component, which is not desired in this embodiment. In order to compensate the same capacitor 23 is connected to the sliding contact of the potentiometer 17 so that an (adjustable) part of the sawtooth voltage across the potentiometer, is passed on together with the voltage across the capacitor 23.

The parabolic voltage is applied through an emitter follower consisting of a transistor 25 with an emitter resistor 26 and through a coupling capacitor 27 to the base electrode of a transistor 28 provided in the adding circuit 11. With the aid of the sawtooth generator 8 and the integrating network 10, which may be constructed similarly to the network 9, a parabolic voltage in synchronism with the raster deflection is produced, said voltage being applied to the base electrode of a second transistor 29 provided in the adding circuit. The two transistors 28 and 29 are provided with separate, non-decoupled emitter resistors 30 and 31 and with a common collector resistor 32, whilst resistors 33 and 34, 35 and 36 connected to the base electrodes of the transistors 28 and 29 respectively serve for the D.C. bias of the transistors.

The voltage from the integrating network 9 produces in the transistor 28 a parabolic current in synchronism with the line deflection, whereas the voltage from the network 10 produces in the transistor 29 a parabolic current in synchronism with the raster deflection. Since the two parabolic currents pass through the common collector resistor 32, the latter has produced across it the sum of a parabolic voltage in synchronism with the line deflection and a parabolic voltage in synchronism with the raster deflection.

The two parabolic voltages are subsequently applied to a cascade circuit of emitter followers in a unit 37, each emitter follower consisting of a transistor (38, 39, 40 and 41 respectively) and an emitter resistor (42, 43, 44 and 45 respectively). Since the emitter followers are connected in cascade, the emitter voltages of all transistors are approximately equal to the output voltage of the adding circuit applied to the base electrode of the transistor 38. The emitter electrode of each emitter follower can therefore furnish the sum of the two parabolic voltages.

The emitter electrode of the transistor 38 is connected to the base electrode of an n-p-n transistor 46. The emitter circuit of the transistor 46 includes a variable resistor 47, which is decoupled for alternating current by a large capacitor 48. The collector circuit of the transistor includes a collector resistor 49.

Owing to the parabolic voltages applied to the base electrode the transistor 46 is alternately opened and cut off. Consequently, the emitter circuit is traversed by an intermittent current, the alternating-current components of which are short-circuited by the capacitor 48, whereas the direct-current component passes through the resistor 47. The direct voltage thus produced across the resistor 47 operates as the clipping level of the transistor 46. As long as the voltage applied to the base electrode is lower than the direct emitter voltage, the transistor is cut off, so that no current passes through the collector resistor 49. However, when a peak of the parabolic voltages applied to the base electrode (see FIG. 2*e*) rises above the direct emitter voltage, the transistor is opened and a small voltage difference between the base and the emitter already suffices to bottom the transistor. In this state a high current flows through the collector resistor 49.

As is shown with reference to FIG. 2 the pulses thus available at the collector electrode of the transistor 46 relate to a circle, the size of which depends upon the clipping level (the direct emitter voltage) of the transistor 46. Since the direct emitter voltage depends upon the resistor 47, the desired size of the circle can be obtained by the adjustment of said resistor.

To the emitter electrodes of the transistors 39, 40 and 41 are connected further clipping devices which include the transistors 50, 51 and 52 respectively and which serve for producing more pulse sequences, which all relate to (concentric) circles of different sizes. The order of succession of the connections of the emitter followers to the clipping devices is preferably chosen so that the clipping device which is conducting for the shortest periods is connected to the first emitter follower, the clipping device which is conducting for the penultimate shortest periods, is connected to the second emitter follower, and so on. This is desirable because in the conducting state a clipping device has a high base current, so that it then constitutes a heavy load for the emitter follower to which the clipping device is connected. The voltage across an emitter resistor of an emitter follower has its peaks flattened owing to the clipping device connected thereto. When the aforesaid order of succession is observed, it is ensured that the flattening of the peak by the clipping device does not affect the effect of the further clipping devices.

The pulse sequences originating from the collector electrodes of the transistors 46, 50, 51 and 52 are amplified in amplifying circuits 53, 54, 55 and 56 and may then be employed for various purposes.

The pulses from the amplifier 56 are applied to the Wehnelt cylinder 13 of the camera tube 1. The clipping level of the transistor 52 is adjusted so that the electron beam is operative in the tube only as long as it is directed to the circular screen 16, whereas when the deflection falls beyond the picture screen, the electron beam is suppressed.

Figure 4A:
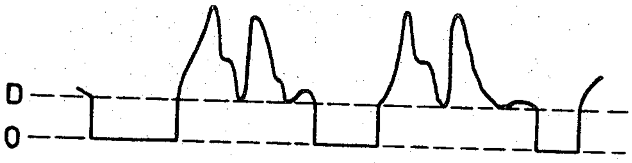
Figure 4B:
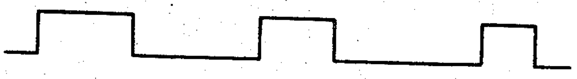

The video signal originating from the picture screen 16 is amplified in a video pre-amplifier 57 and then applied to a device 58; by this device with the aid of the pulses supplied by the amplifier 55, the difference in video signal level is compensated which appears when the electron beam is suppressed and when the electron beam is not suppressed during the scan of dark parts of a scene. FIG. 4*a* illustrates the video signal originating from the picture screen 16. During the periods of suppression of the electron beam owing to the pulses from the amplifier 56 the video signal is equal to zero. With some camera tubes, for example the Vidicon tube, the scan of dark parts of a scene gives rise to a video signal which deviates from the zero level. This level is indicated in FIG. 4*a* by D. The part of the video signal lying between 0 and D does therefore not contain video information, but it occupies part of the range of the video amplifier. In order to avoid this the video signal has joined to it in the unit 58 the pulses shown in FIG. 4*b*, which are supplied by the amplifier 55 with such an amplitude and such a polarity that during the suppression of the electron beam the same video level as that during the scan of dark parts of a scene is obtained.

The video signal is supplied by the amplifier 59 towards the unit 60, where the signal has joined to it the pulses from the amplifier 54, serving for suppression of the electron beam in the television display tube at the receiver end. These pulses, which relate to a circle which is slightly smaller than the circles to which relate the pulses supplied by the amplifiers 55 and 56 determine the final dimensions of the reproduced scene.

The amplifier 59 comprises an automatic gain control which serves to adapt the video signal to the light content of the recorded image. To this end the output signal of the amplifier 59 is applied to a rectifying circuit 61. With the aid of the direct voltage obtained from said rectifier the amplification factor of the amplifier 59 is varied. In certain cases, for example in devices for recording X-ray pictures, it is desirable to adapt the video signal only to the light content of the central portion of the picture, since, in general, this portion is most important. In the embodiment shown in FIG. 3 such a gain control is obtained by applying the video signal to the rectifier 61, through a gate circuit 62, which is controlled by the pulses from the amplifier 53. These pulses relate to a small circle at the centre of the picture. The gate circuit 62 is governed by said pulses so that only the video signal originating from the picture portion inside said circle reaches the rectifier 61, so that the control-voltage produced only depends upon the light content of the central picture portion.

What is claimed is:

1. In an image display system of the type having a source of first and second deflection signals for deflecting an electron beam of a cathode ray tube in two substantially orthogonal directions, means for producing switching pulses in synchronism with said deflection signals comprising means connected to said source for producing first and second parabolic waveform signals synchronized with said first and second deflection signals respectively, means for adding said first and second parabolic signals, means for clipping said added parabolic signals at a predetermined clipping level, and means for deriving said switching signals from said clipping means.

2. In an image display system of the type having a source of first and second deflection signals for deflecting an electron beam of a cathode ray tube in two substantially orthogonal directions, means for producing switching pulses in synchronism with said deflection signals comprising, means connected to said source for producing first and second parabolic waveform signals synchronized with said first and second deflection signals respectively, the ratio of amplitudes of said first and second signals being substantially equal to the square of the aspect ratio between the scan of said electron beam due to said first and second deflection signals, means for adding said first and second parabolic signals, means for clipping said added signals at a predetermined level, and means for deriving said switching signals from said clipping means.

3. In a television system of the type having a cathode ray tube with an electron gun for directing an electron beam toward a screen, and a source of first and second sawtooth waveform deflection signals for scanning said beam across said screen in substantially orthogonal directions, means for generating gating pulses for suppressing said beam when it is directed at predetermined areas of said screen, said means for generating gating pulses comprising means for integrating said first and second deflection signals to provide first and second parabolic waveform signals synchronized with said first and second deflection signals respectively, means for adding said first and second parabolic signals, means for clipping said added parabolic signals at a predetermined level, and means for applying the output of said clipping means to said electron gun.

4. In an image display system of the type having a source of first and second deflection signals for deflecting an electron beam of a cathode ray tube in two substantially orthogonal directions, means for producing switching signals in synchronism with said deflection signals comprising means connected to said source for producing first and second parabolic waveform signals synchronized with said first and second deflection signals respectively, means providing a sawtooth waveform signal synchronized with said first deflection signal, means adding said first and second parabolic signals and said sawtooth waveform signal, means clipping said added signals at a predetermined level, and means for deriving said switching signals from said clipping means.

5. The system of claim 4, comprising means providing a second sawtooth waveform signal synchronized with said second deflection signal, and means for adding said second sawtooth waveform signal to said added signals before said added signals are applied to said clipping means.

6. In an image display system of the type having a source of first and second deflection signals for deflecting the electron beam of a cathode ray tube in two substantially orthogonal directions to form a raster on the screen of said tube, means for generating a plurality of gating signals synchronized with said deflection signals and occurring only during the scanning of predetermined regions of said raster, said generating means comprising means connected to said source for producing first and second parabolic signals synchronized with said first and second deflection signals respectively, adding means connected to add said first and second parabolic signals with a predetermined amplitude ratio, a plurality of cascade-connected amplifier devices connected to the output of said adding means, a separate clipping means connected to each of said amplifier devices for clipping the peaks of the output of the respective amplifier devices at predetermined levels, and means for deriving said gating signals from said clipping means.

7. The system of claim 6, in which said clipping means comprise means which conduct only when the respective input signal has a given polarity with respect to the respective predetermined level, wherein said predetermined levels are adjusted so that each clipping means conducts only when the clipping means connected to the next successive amplifier device conducts.

8. In an image display system of the type having a source of first and second deflection signals for deflecting an electron beam of a cathode ray tube in two substantially orthogonal directions, means for producing switching pulses in synchronism with said deflection signals comprising means for producing first and second parabolic waveform signals synchronized with said first and second deflection signals respectively, means for adding said first and second parabolic signals, means for clipping said added parabolic signals at a predetermined clipping level, and means for deriving said switching signals from said clipping means.

9. In an image display system of the type having a source of first and second deflection signals for deflecting an electron beam of a cathode ray tube in two substantially orthogonal directions, means for producing switching pulses in synchronism with said deflection signals comprising, means for producing first and second parabolic waveform signals synchronized with said first and second deflection signals respectively, the ratio of amplitudes of said first and second signals being substantially equal to the square of the aspect ratio between the scan of said electron beam due to said first and second deflection signals, means for adding said first and second parabolic signals, means for clipping said added signals at a predetermined level, and means for deriving said switching signals from said clipping means.

References Cited

UNITED STATES PATENTS 2,906,919 9/1959 Thor et al. ---------- 315—24

ROBERT L. GRIFFIN, *Primary Examiner.*

R. L. RICHARDSON, *Assistant Examiner.*